(12) United States Patent
Yasue et al.

(10) Patent No.: US 7,883,169 B2
(45) Date of Patent: Feb. 8, 2011

(54) PRINTER AND METHOD OF CONTROLLING OPERATION OF CONTINUOUSLY TRANSPORTING PRINTING MEDIUMS

(75) Inventors: Takuya Yasue, Matsumoto (JP); Jun Fukasawa, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 396 days.

(21) Appl. No.: 11/863,322

(22) Filed: Sep. 28, 2007

(65) Prior Publication Data

US 2008/0084443 A1   Apr. 10, 2008

(30) Foreign Application Priority Data

Sep. 29, 2006   (JP) ............................. 2006-267605

(51) Int. Cl.
*B41J 29/38* (2006.01)
*B41J 2/01* (2006.01)

(52) U.S. Cl. ......................................... 347/16; 347/104
(58) Field of Classification Search ................... 347/16, 347/104

See application file for complete search history.

(56) References Cited

U.S. PATENT DOCUMENTS

2005/0052484 A1* 3/2005 Horiuchi ....................... 347/16
2007/0030299 A1* 2/2007 Izuchi ........................... 347/16

FOREIGN PATENT DOCUMENTS

JP   2002-284373 A   10/2002
JP   2002-284374 A   10/2002

\* cited by examiner

*Primary Examiner*—Matthew Luu
*Assistant Examiner*—Jannelle M Lebron
(74) *Attorney, Agent, or Firm*—Sughrue Mion, PLLC

(57) ABSTRACT

A method of controlling an operation of continuously transporting plural printing mediums including a first medium and a second medium to be transported immediately subsequent to the first medium, includes: actuating a first motor to drive a first roller adapted to transport the printing mediums; actuating a second motor to drive a second roller disposed at a downstream side of the first roller and adapted to transport the printing mediums to a printing area at which a printing operation is to be performed on each printing medium; and controlling actuations of the first motor and the second motor so that the second medium is transported to and stopped at a stop position arranged between the first roller and the second roller while performing the printing operation on the first medium.

9 Claims, 7 Drawing Sheets

FIG. 3
CONTINUOUS-PRINTING PRINT DATA

| |
|---|
| NEXT PAGE EXISTENCE |
| SHEET SIZE DATA |
| ⋮ |
| INK EJECTION PATTERN DATA |
| PAPER FEEDING DISTANCE DATA |
| INK EJECTION PATTERN DATA |
| PAPER FEEDING DISTANCE DATA |
| ⋮ |
| INK EJECTION PATTERN DATA |
| PAGE IDENTIFICATION DATA |
| ⋮ |
| PAGE IDENTIFICATION DATA |
| NEXT PAGE NON-EXISTENCE |
| SHEET SIZE DATA |
| ⋮ |
| INK EJECTION PATTERN DATA |
| PAPER FEEDING DISTANCE DATA |
| INK EJECTION PATTERN DATA |
| PAPER FEEDING DISTANCE DATA |
| ⋮ |
| INK EJECTION PATTERN DATA |
| PAGE IDENTIFICATION DATA |

(Top section: PRINT SETTING DATA, then PRINT DATA BY PRINTING MEDIUM; bottom section: PRINT DATA BY PRINTING MEDIUM)

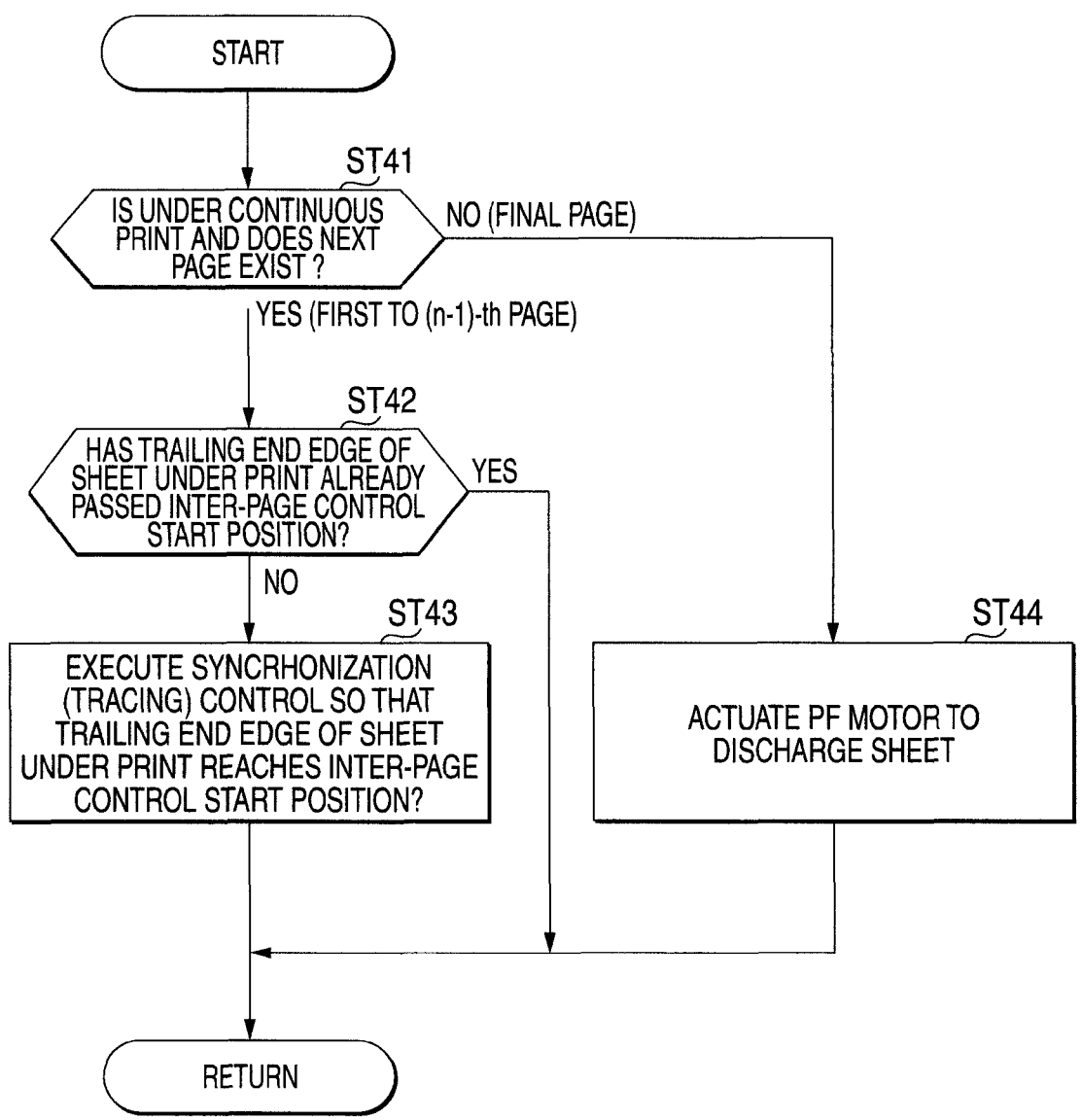

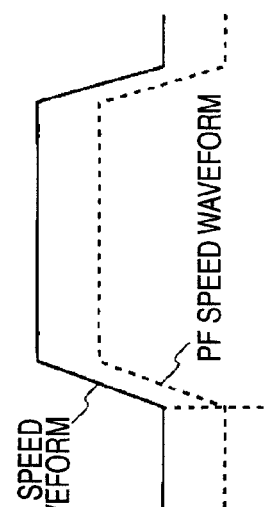

PRINTER AND METHOD OF CONTROLLING OPERATION OF CONTINUOUSLY TRANSPORTING PRINTING MEDIUMS

BACKGROUND

1. Technical Field

The present invention relate$ to a printer and a method of controlling an operation of continuously transporting printing mediums.

2. Related Art

Printers having an LD (Load) roller for supplying a printing medium into the printers and a PF (Paper Feed) roller for transporting the printing medium supplied into the printers are known as ink jet printers for performing a printing operation on a printing medium such as a sheet of regular paper (for example, see JP-A-2002-284373 and JP-A-2002-284374).

Specifically, in the printer described in JP-A-2002-284373 or UP-A-2002-264374, it is possible to continuously feed plural printing sheets by the use of the LD roller with a hopper kept in a raised state. when the plural printing sheets are continuously fed, a feed gap of the printing mediums is shortened, thereby enhancing the number of printing sheets which can be subjected to the printing operation per unit time.

However, like the printer described in JP-A-2002-264373 or JP-A-2002-284374, when the plural printing mediums are continuously fed at a high speed by the use of the LD roller with the hopper kept in the raised state, the following problems are caused. That is, plural printing mediums are continuously fed with a continuous rotation of the LD roller. As a result, the plural printing mediums are continuously fed without any gap therebetween. When the plural printing mediums are fed without any gap therebetween, the printer cannot detect a trailing end edge of the first or subsequent printing medium or cannot detect a leading end edge of the second or subsequent printing medium.

When not detecting the trailing end edge of the first or subsequent printing medium it is difficult to control the printer not to print any content on a margin of the printing medium. When not detecting the leading end edge of the second or subsequent printing medium, for example, it is difficult for the printer to adjust the time for starting the printing operation on the printing medium.

Accordingly, when the plural printing mediums are continuously fed, the printer needs to perform an inter-page control for providing a gap between the previous printing medium and the subsequent printing medium which are continuously fed.

On the other hand, the printer such as an ink jet printer performs a printing operation on the fed printing mediums while transporting the printing mediums by a predetermined amount distance). Accordingly, in the printer such as an ink jet printer, when plural printing mediums are continuously fed, it is necessary to secure a predetermined gap between the plural continuous printing mediums by the use of the inter-page control while transporting the previous printing medium under print by a predetermined distance. The printer should transport the plural printing mediums, which are continuously fed, by a predetermined distance while maintaining the gap secured by the inter-gap control.

However, when the control for transporting the printing medium under print by a predetermined distance is repeatedly performed, the gap between the plural printing mediums which are continuously fed can be easily varied. As a result, the next printing medium may be fed to a position greatly departing from a feed position expected under the control. In the continuous feed of printing mediums, the feed positions of the second or subsequent printing mediums may depart from the feed position expected under the control. The departing distance of the feed position in the continuous feed of printing mediums is great in comparison with a case where the printing mediums are fed sheet by sheet. In this way, when the feed position is greatly varied, print quality on the plural printing mediums is deteriorated. It is considered that the great variation of the feed position results form a cumulative control error due to plural times of paper feeding control after the inter-page control is performed.

SUMMARY

An advantage of some aspects of the invention is to provide a printer and a method of controlling an operation of continuously transporting printing mediums, which can continuously feed the printing mediums while suppressing a variation in feed position of the second or subsequent printing mediums to be continuously fed.

According to an aspect of the invention, there is provided a method of controlling an operation of continuously transporting plural printing mediums including a first medium and a second medium to be transported immediately subsequent to the first medium, the method comprising:

actuating a first motor to drive a first roller adapted to transport the printing mediums;

actuating a second motor to drive a second roller disposed at a downstream side of the first roller and adapted to transport the printing mediums to a printing area at which a printing operation is to be performed on each printing medium; and controlling actuations of the first motor and the second motor so that the second medium is transported to and stopped at a stop position arranged between the first roller and the second roller while performing the printing operation on the first medium.

The present disclosure relates to the subject matter contained in Japanese patent application No. 2006-267605 filed on Sep. 29, 2007, which is expressly incorporated herein by reference in its entirety.

BRIEF DESCRIPTION OF THE DRAWINGS

The invention will be described with reference to the accompanying drawings, wherein like numbers reference like elements.

FIG. 3 is a diagram illustrating a data structure of continuous-printing print data in the embodiment.

FIG. 6 is a flowchart illustrating a flow of processes that are performed by a discharge process instructing section shown in FIG. 2 in the continuous print mode.

FIG. 7 is a diagram illustrating a feature comparison table of a synchronization (tracing) control and a simultaneous drive control.

DESCRIPTION OF EXEMPLARY EMBODIMENTS

Hereinafter, a printer and a method of controlling an operation of continuously transporting printing mediums according to exemplary embodiments of the invention will be described with reference to the accompanying drawings. An ink jet printer is described as an example of the printer. The method of controlling an operation of continuously transporting printing mediums is described as a part of an operation of the ink jet printer.

Figure 1:
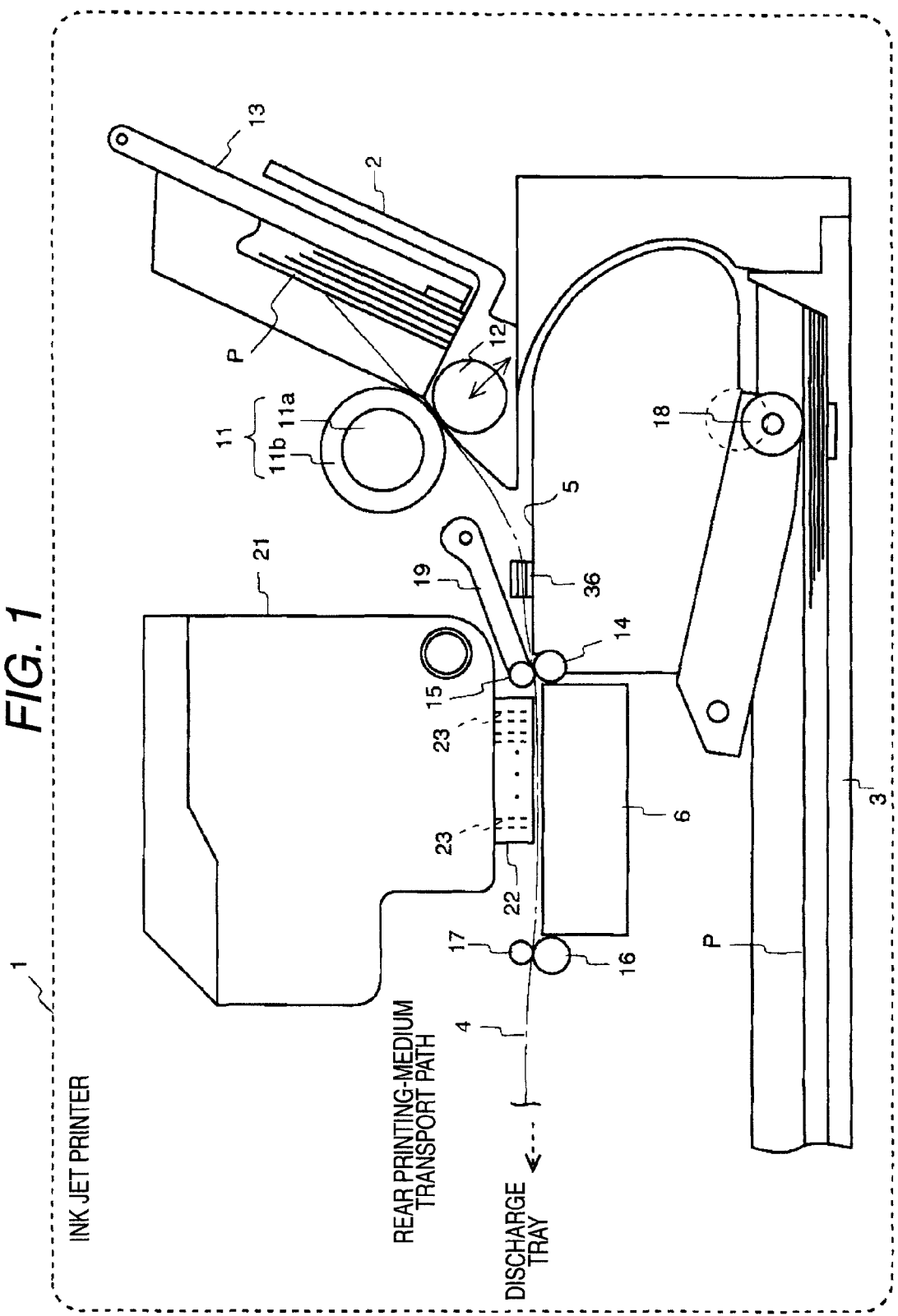
FIG. 1 is a side view of an ink jet printer according to an embodiment of the invention.

FIG. 1 is a side view illustrating a part of a mechanism structure of an ink jet printer according to an embodiment of the invention.

An ink jet printer 1 has a rear feed tray 2 and a front feed tray 3 as a feed tray. The rear feed tray 2 is disposed to protrude upward from a back portion of the ink jet printer 1. The front feed tray 3 is disposed to be substantially parallel to a bottom portion of the ink jet printer 1. The rear feed tray 2 and the front feed tray 3 can receive a variety of printing mediums such as sheets of regular paper, glossy paper, photo paper, postcard paper, and L-size photo paper.

The printing medium P placed on the rear feed tray 2 and the front feed tray 3 are transported along a predetermined printing-medium transport path and are discharged to a discharge tray (not shown) disposed on the front side of the ink jet printer 1. In FIG. 1, a rear printing-medium transport path 4 as the printing-medium transport path is indicated by a dot-dashed line. A guide member 5 regulating the transport direction of the printing mediums P or a platen 6 is disposed along the rear printing-medium transport path 4.

The ink jet printer 1 includes mechanism members for transporting the printing mediums P placed on the rear feed tray 2, such as a load (LD) roller 11, an LD follower roller 12, a hopper 13, a paper feed (PF) roller 14, a PF follower roller 15, a discharge roller 16, and a discharge follower roller 17. The ink jet printer 1 further includes a mechanism member for transporting the printing mediums P placed on the front feed tray 3, such as a second LD roller 18.

The LD roller 11 is disposed to be rotatable adjacent to the lower edge of the rear feed tray 2. The LD roller 11 includes a roller shaft 11a having an axis perpendicular to the paper plane of FIG. 1 and a rubber member 11b provided around the roller shaft. The LD roller 11 is formed in a substantially cylindrical shape. The LD roller 11 rotates with the actuation of an auto sheet feeder (ASF) motor 32 to be described later.

The LD follower roller 12 has a cylindrical shape having a width substantially equal to that of the LD roller 11 and is rotatably disposed below the LD roller 11. The LD follower roller 12 moves to be contacted with the separated from the LD roller 11 with the actuation of an ASF sub motor 33 to be described later. The LD roller 11 and the LD follower roller 12 come in contact with each other in the vicinity of the lower edge of the rear feed tray 2. The LD roller 11 and the LD follower roller 12 come in pressing contact with each other with a predetermined pressing force.

The hopper 13 is disposed so that the lower portion of the rear feed tray 2 is pivotable. The hopper 13 changes its posture to come close to the LD roller 11 when the ID follower roller 12 comes in pressing contact with the LD roller 11, and changes its posture to be separated from the LD roller 11 when the LD follower 12 is separated from the LD roller 11. When printing mediums P are placed on the rear feed tray 2, the lower end of the uppermost printing medium P comes in contact with the LD roller 11 by allowing the hopper 13 to come close to the LD roller 11. The uppermost printing medium P on the rear feed tray 2 is nipped between the hopper 13 and the LD roller 11.

The PF roller 14 is disposed below the rear printing-medium transport path 4 between the guide member 5 and the platen 6. The PF roller is formed in a cylinder shape out of a metal material and is disposed to be rotatable in a state where the axis direction of the cylinder is substantially perpendicular to the paper plane of FIG. 1. Slide-preventing ceramic particles are fixed to the outer peripheral surface of the metal rod so as to form micro unevenness on the outer peripheral surface. The PF roller 14 rotates with the actuation of the PF motor 31 to be described later.

The PF follower roller 15 has a cylinder shape having a width substantially equal to that of the PF roller 14 and is rotatably disposed above the PF roller 14. The PF follower roller 15 is held by a PF-follower-roller arm 19. An urging force which is downward in FIG. 1 acts on the PF-follower-roller arm 19 by a spring not shown. Accordingly, the PF follower roller 15 comes in pressing contact with the PF roller 14 with a large pressing force.

Accordingly, the transport capability (the total transport capability including a holding force) of the printing medium P by the PF roller 14 and the PF follower roller 15 which are in contact with each other is higher than the transport capability of the printing medium P by the LD roller 11 and the LD follower roller 12 which are in contact with each other. Accordingly, when a sheet of printing medium P is nipped between the PF roller 14 and the PF follower roller 15 and is also nipped between the LD roller 11 and the LD follower roller 12, the transport distance of the printing medium P is under a transport control using the PF roller 14 and the PF follower roller 15.

The discharge roller 16 is rotatably disposed below the rear printing-medium transport path 4 between the platen 6 and a discharge tray not shown. The discharge roller 16 rotates with the actuation of the PF motor 31 to be described later.

The discharge follower roller 17 is rotatably disposed above the discharge roller 16. The discharge follower roller 17 comes in pressing contact with the discharge roller 16 with a small pressing force.

The ink jet printer 1 has a printing mechanism for ejecting ink to the printing medium P to perform a printing operation, such as a carriage 21, in addition to the above-mentioned transport mechanism of the printing mediums P.

The carriage 21 is disposed above the platen 6 so as to be movable in a direction perpendicular to the paper plane of FIG. 1. For example, an ink tank not shown and the like are disposed inside the carriage 21. The carriage 21 moves in the direction perpendicular to the paper plane of FIG. 1 with the actuation of a carriage (CR) motor not shown.

A print head 22 is disposed on the bottom of the carriage 21 so as to be opposed to the platen 6. The print head 22 has plural ink ejection nozzles 23. The plural ink ejection nozzles 23 are supplied with the ink from the ink tank. The plural ink ejection nozzles 23 are arranged, for example, in the transport direction of the printing medium P. A piezoelectric element not shown is disposed in each ink ejection nozzle 23. The piezoelectric element is deformed with the applied voltage. When each piezoelectric element is deformed, the amount of ink corresponding to the deformation is extruded from the corresponding ink ejection nozzle 23 and is ejected from the corresponding ink ejection nozzle 23. The ink ejected from the plural ink ejection nozzles 23 is attached to a portion of the printing medium P between the platen 6 and the print head 22.

By applying voltage of waveforms corresponding to print data to the plural piezoelectric elements while moving the carriage 21 in the direction perpendicular to the paper plane of FIG. 1, it is possible to adhere the ink to the portion of the printing medium P between the platen 6 and the print head 22 on the basis of the print data. By repeatedly performing the printing process and the paper feeding process of feeding the printing medium P by a predetermined distance, the ink jet printer 1 can print an image based on the print data on the printing medium P.

Figure 2:
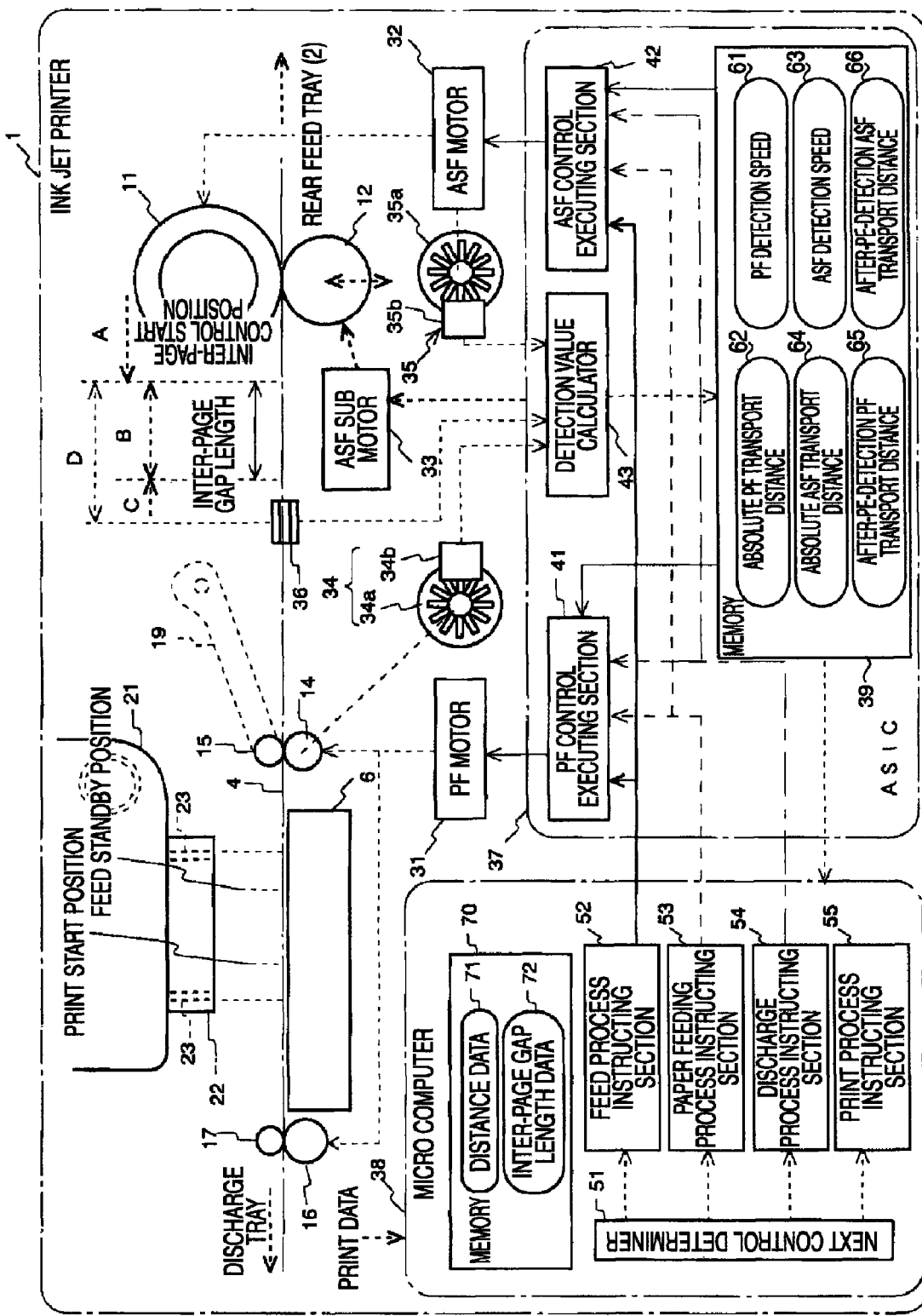
FIG. 2 is a block diagram illustrating a control system of the ink jet printer shown in FIG. 1.

FIG. 2 is a block diagram illustrating a partial configuration of a control system of the ink jet printer 1 shown in FIG. 1. The rear printing-medium transport path 4 and various mechanism members disposed along the path are schematically illustrated in the upper portion of FIG. 2. As a control reference position, an inter-page control start position, a feed standby position, and a print start position are set in the rear printing-medium transport path 4.

The inter-page control start position is set between the LD roller 11 and the PF roller 14. The inter-page control start position is a reference position for performing a control of securing a predetermined inter-page gap length (predetermined inter-paper distance) on two printing mediums P which are continuously transported when plural printing mediums P placed on the rear feed tray 2 are continuously transported. The transport is stopped when the leading end edge of the printing medium P continuously and later transported reaches the inter-page control start position. When the trailing end edge of the printing medium P continuously and previously transported is separated by the predetermined inter-page gap length from the inter-page control start position, the transport of the printing medium P continuously and later transported is resumed. By the use of such an inter-page control, it is possible to secure the inter-page gap length between the plural printing mediums P which are continuously transported.

The feed standby position is a target stop position of the leading and edge of the printing medium P in a usual feed process. The feed standby position is set to a position separated downstream by a predetermined distance (for example, 3 to 5 mm) from the most upstream nozzle (close to the rear feed tray 2) in the transport direction of the printing mediums P among the plural ink ejection nozzles 23 formed in the print head 22.

The print start position is a target stop position of the leading end edge of the printing medium P at the time of starting a printing operation on the printing medium P. The print start position is set to a position separated upstream by a predetermined distance (for example, 3 to 5 mm) from the most downstream nozzle (close to the discharge tray) in the transport direction of the printing mediums P among the plural ink ejection nozzles 23 formed in the print head 22.

In this way, by providing the feed standby position more upstream in the transport direction of the printing mediums P than the print start position, the printing medium P is temporarily stopped at the feed standby position and then is fed to the print start position in the usual feed process. Accordingly, compared with the case where the printing medium P is transported at a time from the rear feed tray 2 to the print start position by means of one time of control, it is possible to enhance the precision of the stop position of the printing medium P relative to the print start position.

In the following description, it is assumed that a range from the rear feed tray 2 to the inter-page control start position is referred to as area A, a range from the inter-page control start position to a position separated downstream by the inter-page gap length therefrom is referred to as area B, and a range from the position separated by the inter-page gap length to the discharge tray is referred to as area C.

The ink jet printer 1 includes a PF motor 31 for driving the PF roller 14 and the discharge roller 16 to rotate, an ASF motor 32 for driving the LD roller 11 to rotate, an ASF sub motor 33 contracting and separating the LD follower roller 12 with and from the LD roller 11, a CR motor not shown, a PF rotary encoder 34, an ASF rotary encoder 35, a page edge (PE) sensor 36 as a sensor, an ASIC (Application Specification Integrated Circuit) 37, and a micro computer 38.

A pulse motor such as a DC (direct current) motor and a stepping motor can be used for the PF motor 31, the ASF motor 32, the ASF sub motor 33, and the CR motor. The DC motor rotates at a rated speed when a predetermined DC voltage is applied thereto. When the applied voltage is controlled in a PWM (Pulse Width Modulation) manner, the DC motor rotates at a speed corresponding to a duty ratio lower than the rated speed. The DC motor rotates inversely when the polarity of the DC voltage is inverted.

The PF rotary encoder 34 has a PF scale plate 34a rotating along with the PF roller 14 and a PF photo interrupter 34b for detecting plural slits formed along the outer periphery of the PF scale plate 34a. When the PF scale plate 34a rotates together with the PF roller 14, the PF photo interrupter 34b of the PF rotary encoder 34 generates a detection signal of which the level varies with the detection of the slits. The detection signal has a pulse waveform. The pulse period of the detection signal varies with the rotation speed of the PF scale plate 34a. For example, when the rotation speed of the PF scale plate 34a is enhanced, the pulse period of the detection signal is shortened.

The ASF rotary encoder 35 includes an ASF scale plate 35a rotating along with a rotor of the ASF motor 32 and an ASF photo interrupter 35b for detecting plural slits formed along the outer periphery of the ASF scale plate 35a. The rotation amount of the rotor of the ASF motor 32 has a predetermined relation with the rotation amount of the LD roller 11. The rotation amount of the ASF scale plate 35a can correspond to the rotation amount of the LD roller 11. When the ASF scale plate 35a rotates together with the ASF motor 32 and the LD roller 11, the ASF photo interrupter 35b of the ASF rotary encoder 35 generates a detection signal which has a pulse waveform and of which the level varies with the detection of the slits.

In the PE sensor 36, a light-emitting element and a light-receiving element not shown are opposed to each other with a predetermined gap therebetween. The PE sensor 36 is disposed so that the rear printing-medium transport path 4 is located between the light-emitting element and the light-receiving element. The PE sensor 36 is disposed at a position separated downstream by at least the inter-page gap length from the inter-page control start position and between the LD roller 11 and the PF roller 14. The light-receiving element of the PE sensor 36 outputs a detection signal which varies depending on the light-receiving state of the light emitted from the light-emitting element. The PE sensor 36 outputs a detection signal which varies depending on the existence or absence of the printing medium P between the light-emitting element and the light-receiving element.

The ASIC 37 is a king of a micro computer and includes a memory 39, a CPU (Central Processing Unit) not shown, a timer, and an input/output port. The detection signal of the PF rotary encoder 34, the detection signal of the ASF rotary encoder 35, and the detection signal of the PE sensor 36 are input to the input/output port. By allowing the CPU not shown to execute a predetermined program, the ASIC 37 embodies a PF control executing section 41, an ASF control executing section 42, and a detection value calculator 43.

The micro computer 38 includes a memory 70, a CPU not shown, a timer, and an input/output port. The memory 70 of the micro computer 38 stores distance data 71 as data on the inter-page control start position (predetermined control start position) and the inter-page gap length data 72. The distance data 71 is data on the distance from the inter-page control start position to the detection position of the PE sensor 36, which is indicated by distance D in FIG. 2. Distance D is larger than the inter-page gap length. The input/output port of the micro computer 38 is connected to the input/output port of the ASIC 37. By allowing the CPU not shown to execute a predetermined program, the micro computer 38 embodies a next control judgment section 51, a feed process instructing section 52, a paper feeding process instructing section 53, a discharge process instructing section 54, and a print process instructing section 55.

The program executed by the CPU of the ASIC 37 may be stored, for example, in the memory 39 or the like of the ASIC 37. The program executed by the CPU of the micro computer 38 may be stored, for example, in the memory 70 or the like of the micro computer 38. The programs or parts thereof may be stored in the memories 39 and 70 before shipping the ink jet printer 1 or may be stored in the memories 39 and 70 after shipping the ink jet printer 1. The programs or parts thereof stored in the memories 39 and 70 after shipping the ink jet printer 1 may be those which have been recorded in a computer-readable recording medium such as a CD-ROM and have been read and stored in the memories 39 and 70 by the use of a personal computer connected to the ink jet printer 1, or may be those which have stored in a server unit and have been downloaded through a transmission medium such as Intern et and stored in the memories 39 and 70 by the use of the personal computer connected to the ink jet printer 1.

The detection value calculator 43 embodied by the ASIC 37 generates various detection values on the basis of the detection signal of the PF rotary encoder 34, the detection signal of the ASF rotary encoder 35, and the detection signal of the PE sensor 36 which are input to the ASIC 37 and updates the data stored in the memory 39. The detection value calculator 43 periodically generates various detection values, for example, with a PID control period and updates the memory 39.

Specifically, the detection value calculator 43 measures the number of pulses per unit time in the detection signal of the PF rotary encoder 34 as a PF interval pulse number. The detection value calculator 43 stores the PF interval pulse number in the memory 39 as a PF detection speed 61 representing a transport speed by the PF roller 14.

The detection value calculator 43 measures a cumulative number of pulses in the detection signal of the PF rotary encoder 34 as a PF cumulative pulse number. The detection value calculator 43 stores the PF cumulative pulse number in the memory 39 as an absolute PF transport distance 62 representing a cumulative transport distance by the PF roller 14.

The detection value calculator 43 measures the number of pulses per unit time in the detection signal of the ASF rotary encoder 35 as an ASF interval pulse number. The detection value calculator 43 stores the ASF interval pulse number in the memory 39 as an ASF detection speed 63 representing a transport speed by the LD roller 11.

The detection value calculator 43 measures a cumulative number of pulses in the detection signal of the ASF rotary encoder 35 as an ASF cumulative pulse number. The detection value calculator 43 stores the ASF cumulative pulse number in the memory 39 as an Absolute ASF transport distance 64 representing a cumulative transport distance by the LD roller 11.

The detection value calculator 43 judges whether the printing medium P is detected by the PE sensor 36, on the basis of the level of the detection signal of the PE sensor 36. When the printing medium P is detected, the detection value calculator 43 counts the number of pulses in the detection signal of the PF rotary encoder 34 after the detection. The detection value calculator 43 stores the counted number of pulses in the memory 39 as an after-PE-detection PF transport distance 65. When the printing medium P is detected, the detection value calculator 43 counts the number of pulses in the detection signal of the ASF rotary encoder 35 after the detection. The detection value calculator 43 stores the counted number of pulses in the memory 39 as an after-PE-detection ASF transport distance 66.

The PF control executing section 41 controls the actuation of the PF motor 31. The PF control executing section 41 generates an instantaneous current value for controlling the driving speed or the rotation direction of the PF motor 31 so that the PF detection speed 61 stored in the memory 39 complies with a predetermined speed profile. The PF control executing section 41 generates an instantaneous current value so as to stop with a transport distance based on an instruction or the like.

The ASF control executing section 42 controls the actuation of the ASF motor 32. The ASF control executing section 42 generates an instantaneous current value for controlling the driving speed or the rotation direction of the ASF motor 32 so that the ASF detection speed 63 stored in the memory 39 complies with a predetermined speed profile. The ASF control executing section 42 generates an instantaneous current value so as to stop with a transport distance based on an instruction or the like.

The feed process instructing section 52 embodied by the micro computer 38 generates an instruction for performing a feed process of transporting a non-printed printing medium P, for example, from the rear feed tray 2 to a print start position. Specifically, the feed process instructing section 52 instructs the PF control executing section 41 to perform a feed control and instructs the ASF control executing section 42 to perform a feed control. The feed process instructing section 52 gives an instruction for actuating the ASF sub motor 33 to the ASIC 37.

The paper feeding process instructing section 53 generates an instruction for performing a paper feeding process of transporting a printing medium P, which is being fed in a printing area between the print head 22 and the platen 6, by a predetermined distance. Specifically, the paper feeding process instructing section 53 instructs a target PF transport distance to the PF control executing section 41. In a continuous print mode in which plural printing medium P are continuously transported for pint, the paper feeding process instructing section 53 a target ASF transport distance to the ASF control executing section 42.

The discharge process instructing section 54 generates an instruction for performing a discharge process of transporting a printing medium P, which has been fed to the printing area, for example, from the printing area to the discharge tray. Specifically, the paper feeding process instructing section 53 instructs the target PF transport distance to the PF control executing section 41. In the continuous print mode, the discharge process instructing section 54 instructs the target ASF transport distance to the ASF control executing section 42.

The print process instructing section 55 generates an instruction for once scanning a printing medium P having been fed to the printing area. Specifically, the print process instructing section 55 instructs the ASIC 37 to actuate the CR motor not shown and instructs to apply voltages of waveforms corresponding to the print data to the plural piezoelectric elements in a state where the print head 22 is opposed to the printing medium P.

The next control judgment section 51 judges the state when the ink jet printer 1 is stopped. Then, the next control judgment section 51 selects one out of the plural process instructing sections of the feed process instructing section 52, the paper feeding process instructing section 53, the discharge process instructing section 54, and the print process instructing section 55 as the judgment result and instructs the selected process instructing section to perform its process.

For example, when print data are supplied to the ink jet printer from a personal computer not shown and the ink jet printer is in a printable state, the next control judgment section 51 sequentially selects one of the feed process instructing section 52, the paper feeding process instructing section 53, the discharge process instructing section 54, and the print process instructing section 55 and instructs the selected process instructing section to perform its process every selection, so as to perform a printing operation based on the print data. When the printing operation is performed normally, the next control judgment section 51 first selects the feed process instructing section 52, alternately selects the print process instructing section 55 and the paper feeding process instructing section 53 until the non-printed print data do not remain, and selects the discharge process instructing section 54 when the non-printed print data do not remain. Accordingly, the printing medium P is fed to the printing area opposed to the print head 22, is subjected to the printing operation based on the print data by repeating the printing scan and the paper feeding by a predetermined distance, and then is discharged to the discharge tray.

Next, operations of the ink jet printer 1 according to the embodiment having the above-mentioned configuration will be described. Here, the operation in the continuous print mode will be specifically described.

FIG. 3 is a diagram illustrating a data structure of continuous-printing print data supplied to the ink jet printer 1 shown in FIG. 1.

The continuous-printing print data supplied to the ink jet printer 1 includes print data by printing medium which is used to control the printing operation on the corresponding printing medium P. The print data by printing medium includes print setting data for specifying a size of a sheet to be subjected to the printing operation, plural ink ejection pattern data in which an image to be printed on the printing medium P is divided, for example, by a print width, plural paper feeding distance data interposed between two continuous ink ejection pattern data, and page identifying data. The plural ink ejection pattern data and the plural paper feeding distance data are alternately arranged in the print data by printing medium.

The print setting data includes sheet size data for specifying a size of a sheet to be subjected to the printing operation. In a continuous printing operation, the sheet size data included in the print data by printing medium are constant basically. The print setting data in the continuous printing operation additionally include next page existence data or next page non-existence data. When it is assumed that the number of pages is n (where n is an integer equal to or greater than 2), the next page existence data is included in the print data by printing medium of the first to (n-1)-th page and represents that a next printing page exists. The next page non-existence data is included in the print data by printing medium of the n-th page and represents that a next printing page does not exist. The print setting data is asked to the print data by a printer driver not shown and installed in a personal computer communicating with the ink jet printer 1 at the time of generating the print data. In controlling the continuous printing operation to be described later, the control can be performed even when the next page non-existence data is not included.

The continuous-printing print data are generated when a high-speed printing operation on plural sheets of regular paper in which the rear feed tray 2 of the ink jet printer 1 is designated is specified in the personal computer. In the other printing operation, for example, when the printing operation is performed on a sheet of exclusive-use paper, the personal computer generates the usual print data. The usual print data has a data structure which is obtained by removing the next page existence data ox the next page non-existence data from the print data by printing medium shown in FIG. 3.

When the continuous-printing print data having the above-mentioned data structure are supplied, the inkjet printer 1 performs a printing operation in the continuous print mode. The ink jet printer 1 performs the printing operation while continuously transporting plural printing mediums P placed on the rear feed tray. Similarly to the usual print mode, the next control judgment section 51 of the ink jet printer 1 first selects the feed process instructing section 52, alternately selects the print process instructing section 55 and the paper feeding process instructing section 53 until the non-printed print data does not remain, and then selects the discharge process instructing section 54 when the non-printed print data does not remain, every printing medium P. The next control judgment section 51 transports the printing mediums P of the number of sheets designated by the continuous-printing print data and performs the printing operation on the printing mediums.

Now, detailed printing operations of the ink jet printer 1 in the continuous print mode will be described.

Figure 4:
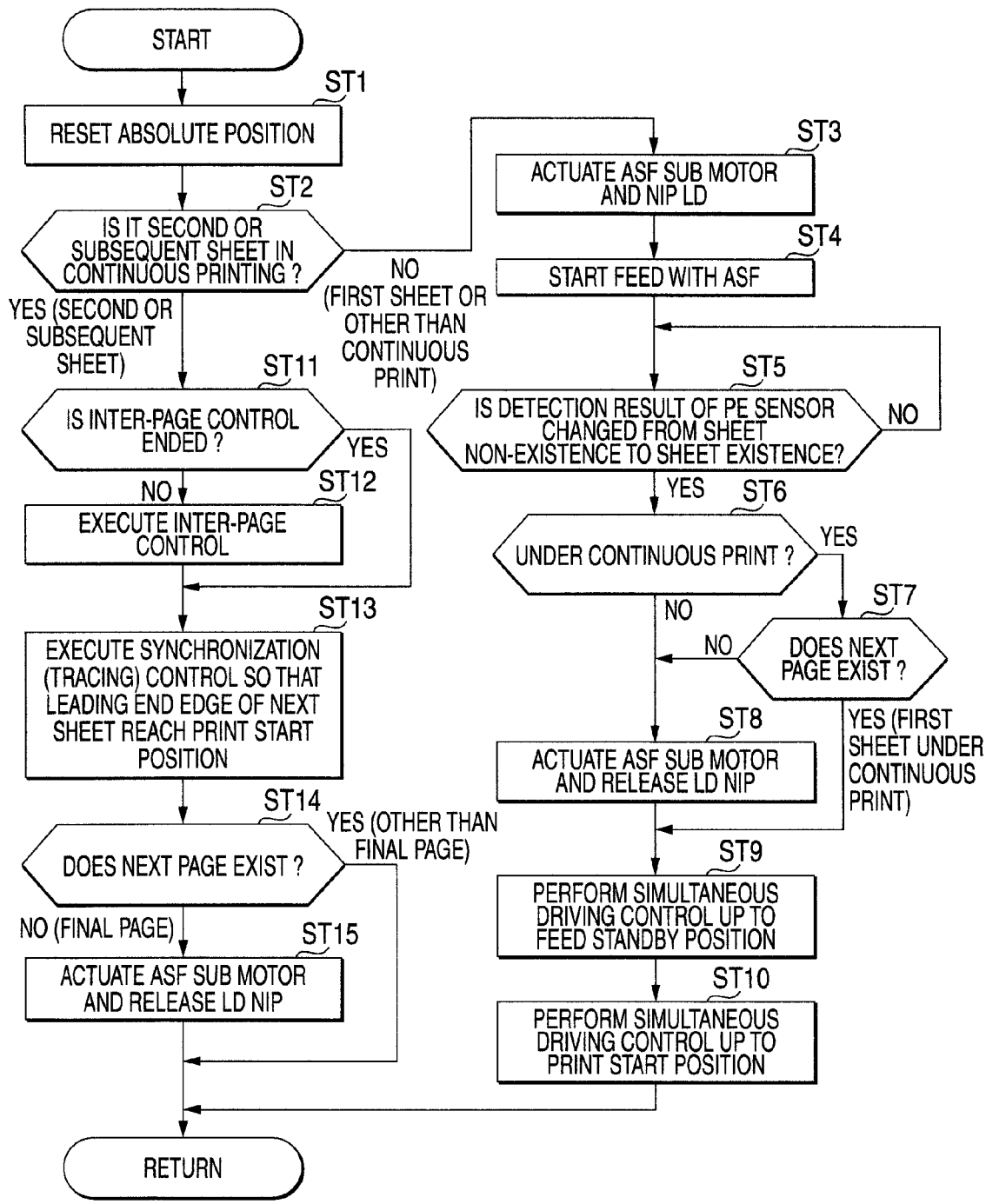
FIG. 4 is a flowchart illustrating a flow of processes that are performed by a feed process instructing section shown in FIG. 2 in a continuous print mode.
Figure 5:
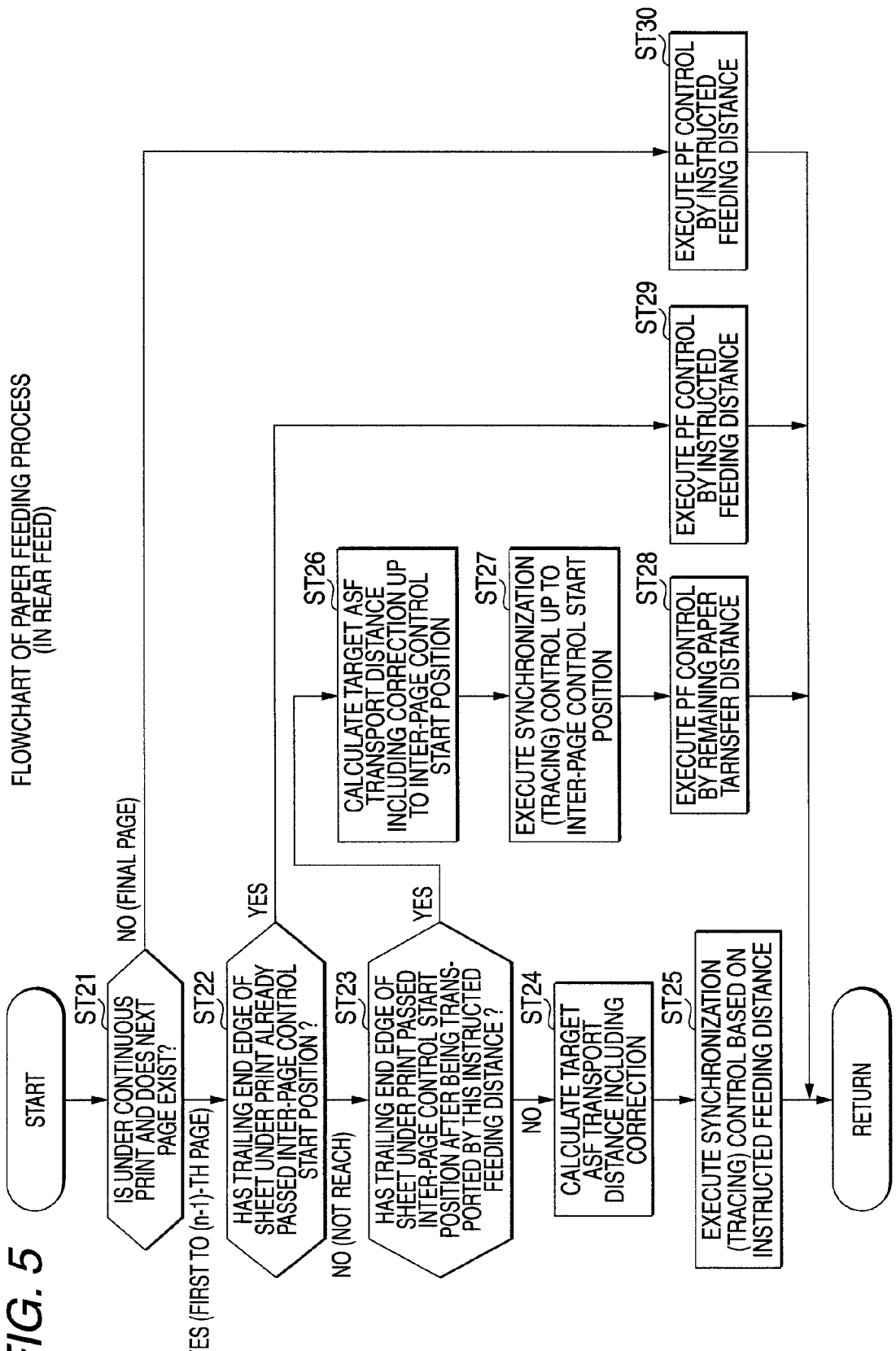
FIG. 5 is a flowchart illustrating a flow of processes that are performed by a paper feeding process instructing section shown in FIG. 2 in the continuous print mode.

FIG. 4 is a flowchart illustrating a flow of processes that are performed by the feed process instructing section 52 shown in FIG. 2. in the continuous print mode. FIG. 5 is a flowchart illustrating a flow of processes that are performed by the paper feeding process instructing section 53 shown in FIG. 2 in the continuous print mode. FIG. 6 is a flowchart illustrating a flow of processes that are performed by the discharge process instructing section 54 shown in FIG. 2 in the continuous print mode.

When the continuous-printing print data shown in FIG. 3 are supplied to the ink jet printer 1, the next control judgment section 51 starts processing data. The next control judgment section 51 checks that the ink jet printer 1 is in a printable state and then reads data from the head of the continuous-printing print data. The next control judgment section 51 reads print set data of the print data for each printing medium of the first printing medium and instructs the feed process instructing section 52 to perform a feed process.

A reception buffer for print data (not shown) of the ink jet printer 1 is limited in physical capacity. Accordingly, the continuous-printing print data are divided into plural pieces depending on the empty state of the reception buffer and are supplied to the ink jet printer 1. In this situation, the next control judgment section 51 can read data from the head of the continuous-printing print data. The ltracing in physical capacity of the reception buffer does not cause any problem in control.

The feed process instructing section 52 instructed to perform its process performs the flowchart of the feed process shown in FIG. 4. The feed process instructing section 52 first resets the absolute PF, transport distance 62 and the absolute ASF transport distance 64 stored in the memory 39 of the ASIC 37 to "0" (step ST1). Accordingly, the absolute PF transport distance 62 and the absolute ASF transport distance 64 represent a transport distance from the feed tray for each printing medium P.

After resetting the absolute position, the feed process instructing section 52 judges whether this feed process is performed on the second or subsequent printing medium in the continuous printing operation (step ST2) The feed process instructing section 52 judges that this feed process is for the continuous printing operation, for example, when the print data by printing medium includes the next page existence data and judges that it is the second or subsequent printing medium when the printing operation is being performed. This feed process is for a first printing medium the continuous printing operation. Accordingly, the feed process instructing section 52 judges No in step ST2.

When judging that it is not the second or subsequent printing medium in the continuous printing operation, the feed process instructing section 52 instructs the ASIC 37 to actuate the ASF sub motor 33 (step ST3). The ASIC 37 actuates the ASF sub motor 33. Accordingly, the LD follower roller 12 comes in pressing contact with the LD roller 11. The hopper 13 nips the plural printing mediums P on the rear feed tray 2 with the LD roller 11.

After actuating the ASF sub motor 33 to bring the LD follower roller 12 into pressing contact with the LD roller 11, the feed process instructing section 52 instructs the ASF control executing section 42 to start the feed process (step ST4). Specifically, the feed process instructing section 52 instructs the ASF control executing section 42 to perform the feed controls The ASF control executing section 42 starts the actuation of the ASF motor 32. The LD roller 11 starts its rotation with the actuation of the ASF motor 32. The uppermost printing medium P coming in contact with the LD roller 11 starts its transport with the rotation of the LD roller 11.

The LD follower roller 12 is in pressing contact with the LD roller 11. Accordingly, even when a printing medium P other than the uppermost printing medium P, for example, the second upper printing medium P, starts its transport along with the uppermost printing medium F with the rotation of the LD roller 11, the printing medium P other than the uppermost printing medium P can hardly pass through the nip position between the LD roller 11 and the LD follower roller. The LD follower roller 12 serves as a load for hindering the second printing medium F from being transported.

When the ASF motor 32 is actuated, the ASF rotary encoder 35 starts outputting the detection signal having a pulse waveform. The detection value calculator 43 updates the ASF detection speed 63 and the absolute ASF transport distance 64 i n the memory 39 on the basis of the detection signal.

The ASF control executing section 42 having started the actuation of the ASF motor 32 reads the AS detection speed 63 stored in the memory 39 with a predetermined period such as a PID control period. The ASF control executing section 42 generates an instantaneous current value having a PID control value corresponding to a deviation of the ASF detection speed 63 from the target ASF speed. The rotation speed of the ASF motor 32 varies depending on the instantaneous current value. The ASF control executing section 42 performs the PID control so that the ASF detection speed 63 complies with a predetermined speed profile. The printing medium is transported at a predetermined speed.

The printing medium P having started its transport with the rotation of the LD roller 11 moves toward the discharge tray along the rear printing-medium transport path 4. The printing medium P passes the PE sensor 36 and then collides with the PF roller 14 and the PF follower roller 15.

When the leading end edge of the printing medium P goes between the light-emitting element and the light-receiving element of the PE sensor 36, the detection signal of the PE sensor 36 is changed from sheet existence to sheet-non-existence. When the sheet of printing medium is detected by the PE sensor 35, the detection value calculator 43 starts updating the After-PE-detection PF transport distance 65 and the After-PE-detection ASF transport distance 66 stored in the memory 39. At this time, the actuation of the PF motor 31 is not started. The detection value calculator 43 repeatedly updates the After-PE-detection PF transport distance 65 to "0".

The detection value calculator 43 updates the After-PE-detection PF transport distance 65 on the basis of the transport distance of the LD roller 11 calculated based on the detection signal of the PF rotary encoder 34 after the printing medium P is detected by the PE sensor 36. The detection value calculator 43 updates the After-PE-detection ASF transport distance 66 on the basis of the transport distance of the LD roller 11 calculated based on the detection signal of the ASF rotary encoder 35 after the printing medium P is detected by the PE sensor 36.

The detection value calculator 43 may always update the After-PE-detection PF transport distance 65 or the After-PE-detection ASF transport distance 66 on the basis of to the detection signal of the ASF rotary encoder 35 or the PF rotary encoder 34.

The feed process instructing section 52 recognizes that the PE sensor 36 detects the printing medium P, for example, on the basis of the After-PE-detection PF transport distance 65 or the After-PE-detection ASF transport distance 66, after starting driving the LD roller 11 in step ST4 (stop ST5). The feed process instructing section 52 judges whether this feed process is for a continuous printing operation (step ST6). When this feed process is for the continuous printing operation, the feed process instructing section 52 judges whether a next page remains to be printed (step ST 7). The feed process instructing section 52 judges that this feed process is for the continuous printing operation and a next page remains to be printed, for example, when the next page existence data is included in the print data by printing medium. It is assumed that this feed process is for the first printing medium in the continuous printing operation and a next page remains to be printed. The feed process instructing section 52 judges Yes in step ST7 and starts a simultaneous driving control to the feed standby position to be described later (step ST9). The LD follower roller 12 is kept pressed on the LD roller 11.

When this feed process is not for the continuous printing operation (No in step ST6) or when a next page does not remain (No in step ST7) the feed process instructing section 52 instructs a nip release to the ASIC 37 (step ST8). The ASIC 37 actuates the ASF sub motor 33 to separate the LD follower roller 12 from the LD roller 11.

Next, the feed process instructing section 52 executes the simultaneous driving control to the feed standby position (step ST9) The feed process instructing section 52 instructs the PF control executing section 41 to actuate the PF motor 31 and instructs the ASF control executing section 42 to actuate the ASF motor 32 The PF control executing section 41 starts actuating the PF motor 31. The ASF control executing section 42 starts actuating the ASF motor 32. The PF roller 14 and the PF follower roller 15 start their rotations along with the LD roller 11 and the LD follower roller 12. The printing medium P in contact with the PF roller 14 and the PF follower roller 15 is nipped between the PF roller 14 and the PF follower roller 15, and then is fed to the printing area with the rotations of the LD roller 11, the LD follower roller 12, the PF roller 14, and the PF follower roller 15.

When the PF motor 31 is actuated, the PF rotary encoder 34 starts outputting the detection signal of a pulse waveform with the rotation of the PF roller 14. The detection vale calculator 43 updates the PF detection speed 61, the absolute PF transport distance 62, and the After-PE-detection PF transport distance 65 in the memory 39. The After-PE-detection PF transport distance 65 is updated to a value other than "0". The PF control executing section 41 actuating the PF motor 31 reads the PF detection speed 61 stored in the memory 39 with a predetermined period such as a PID control period. The PF control executing section 41 generates an instantaneous, current value having a PID control value corresponding to the deviation of the PF detection speed 61 from the target PF speed. The rotation speed of the PF motor 31 varies depending on the instantaneous current value. The PF control executing section 41 performs a PID control so that the PF detection speed 61 complies with a predetermined speed profile. The printing medium P is transported a predetermined speed.

The PF control executing section 41 instructed to perform the feed control periodically reads the After-PE-detection PF transport distance 65 stored in the memory 39 of the ASIC 37. When the read after-PE-detection PF transport distance 65 reaches a predetermined transport distance, the PF control executing section 41 starts a deceleration control with a predetermined number of pulses so as to stop the PF motor 31. The PF control executing section 41 reduces a current instruction value to the PF motor 31 and stops.

Similarly, the ASF control executing section 42 periodically reads the absolute ASF transport distance 64 stored in the memory 39 of the ASIC 37. When the read after-PE-detection ASF transport distance 66 reaches a predetermined transport distance, the ASP control executing section 42 starts a deceleration control with a predetermined number of pulses so as to stop the PF motor 31. The ASF control executing section 42 reduces a current instruction value to the F motor 32 and stops.

In this way the uppermost printing medium P placed on the rear feed tray 2 is fed so that the leading end edge thereof is stopped at the feed standby position. The first printing medium P is fed to the feed standby position by the simultaneous driving control of the PF motor 31 and the ASF motor 32.

When feeding the first printing medium P to the feed standby position, the feed process instructing section 52 instructs the PF control executing section 41 and the ASF control executing section 42 to perform the feed control to the print start position. The PF control executing section 41 and the ASF control executing section 42 further transport the printing medium P to the print start position by the simultaneous driving control of the PF motor 31 and the ASF motor 32 (step ST10).

When the feed process by the simultaneous driving control is ended, the feed process instructing section 52 ends the feed process on the first printing medium. The PF roller 14 or the LD roller 11 is stopped. The PF detection speed 61 and the ASF detection speed 63 stored in the memory 39 of the ASIC 37 are updated to "0". The next control judgment section 51 judges that the ink jet printer 1 stops normally on the basis of the speed data of the memory 39 and successively reads the first data of the continuous-printing print data. The next control judgment section 51 reads the first ink ejection pattern data of the print data for the first printing medium and instructs the print process instructing section 55 to perform its process.

The print process instructing section 55 instructed to perform its process performs the print process. The print process instructing section 55 supplies the ASIC 37 with the ink ejection pattern data and instructs the ASIC to actuate the CR motor not shown. The carriage 21 moves with the actuation of the CR motor by the ASIC 37. With the plural ink ejection nozzles 23 of the print head 22 opposed to the fed printing medium P, the ASIC 37 applies voltages of waveforms based on the ink ejection pattern data to the plural piezoelectric elements. Ink is ejected from the plural ink ejection nozzles 23 and adhered to the printing medium P.

When the above-mentioned print control process is ended, the print process instructing section 55 ends the first printing scan operation. The next control judgment section 51 judges that the ink jet printer 1 stops normally on the basis of the detection speed of the carriage 21 or the like, and reads the first page data of the continuous-printing print data. The next control judgment section 51 reads the first paper feeding distance data of the print data for the first printing medium and instructs the paper feeding process instructing section 53 to perform its process.

The paper feeding process instructing section 53 instructed to perform its process executes the flow of the paper feeding process shown in FIG. 5. The paper feeding process instructing section 53 first judges whether this paper feeding process is for the continuous printing operation and a next page remains on the basis of the continuous-printing print data (step ST21). For example, when the next page existence data is included in the print data by printing medium, the paper feeding process instructing section 53 judges that this paper feeding process is for the continuous printing operation and a next page remains. It is assumed that this paper feeding process is for the first printing medium P in the continuous printing operation. Accordingly, the paper feeding process instructing section 53 judges Yes in step ST21.

The paper feeding process instructing section 53 then judges whether the current position of the trailing end edge of the printing medium P under print passes the inter-page control start position (step ST22). The paper feeding process instructing section 53 specifies the length in the transport direction of the printing medium P by the use of the sheet size data included in the print data by printing medium, and compares the specified length with the distance (hereinafter, referred to as a feed ending distance) from the inter-page control start position to the leading end edge of the printing medium P under print. For example, when the feed ending distance is great, the paper feeding process instructing section 53 judges that the current position of the trailing end edge of the printing medium under print passes the inter-page control start position. This paper feeding process is the first paper feeding process of the printing medium P and the printing medium P under print exists at the inter-page control start position. Accordingly, the paper feeding process instructing section 53 judges No (not pass) in step ST22.

In feeding the first printing medium, the after-PE-detection PF transport distance 65 is repeatedly updated to "0" until the leading end edge of the printing medium P moves to the PF roller 14 from the detection position of the PE sensor 36. Accordingly, when the after-PE-detection PF transport distance 65 is used to calculate the feed ending distance, the known distance (for example, the measured distance or the designed distance) from the detection position of the PE sensor 36 to the PF roller 14 is added to the after-PE-detection PF transport distance 65. Accordingly, it is possible to obtain the feed ending distance from the inter-page control start position to the leading end edge of the printing medium P under print.

The paper feeding process instructing section 53 judges whether the trailing end edge of the printing medium P under print passes the inter-page control start position as a result of this paper feeding process (step ST23). The paper feeding process instructing section 53 specifies the length in the transport direction of the printing medium P on the basis of the sheet size data included in the print data by printing medium and compares the specified length with the value obtained by adding this instructed paper feeding distance to the calculated feed ending distance. For example, when the value obtained by adding this instructed paper feeding distance to the feed ending distance is great, the paper feeding process instructing section 53 judges that the position of the trailing end edge of the printing medium P under print passes the inter-page control start position. This paper feeding process is the first paper feeding process of the printing mediums P. Accordingly, the paper feeding process instructing section 53 usually judges No in step ST23.

When judging No in step ST23, the paper feeding process instructing section 53 sets as a new target PF transport distance (number of pulses) a difference between a value, which is obtained by adding the newly instructed paper feeding distance to the cumulative value of the target PF transport distance instructed to the PF control executing section 41 after the feed process is ended, and the absolute PF transport distance 62 (actual transport distance based on the previous instruction) after the feed process is ended and calculates a new target ASF transport distance (number of pulses.) additionally including a correction distance (step ST24). Specifically, the paper feeding process instructing section 53 calculates the new target ASF transport distance including the correction distance by the use of Expression 1. The new target ASF transport distance including the correction distance is slightly larger than the new target PF transport distance.

In Expression 1, "1.05" is a target transport distance correction ratio coefficient representing an extra transport by 5%. The target transport distance correction ratio coefficient may be larger than 1 and equal to or smaller than, for example, 1/05. When the coefficient is 1 or less, the effect of correction is not sufficient and when the coefficient is larger than 1.05, the warp of the printing medium P going into the PD roller 11 increases and the transport distance of the printing medium P does not suitably follow the transport distance of the PF roller 14.

Expression 1

Target ASF transport distance (number of pulses)=target PF transport distance (number of pulses)×1.05

When the resolution of the transport distance of the PF rotary encoder 34 is different from the resolution of the transport distance of the ASF rotary encoder 35, a correction coefficient of the resolution based on the ratio of the number of detection pulses of the PF rotary encoder 34 and the number of detection pulses of the ASF rotary encoder 35 in a predetermined transport distance is multiplied by the target ASF transport distance calculated from Expression 1 and the calculation result is set as the new target ASF transport distance (number of pulses) instructed to the ASF control executing section 42.

After calculating the target PF transport distance (number of pulses) and the target ASF transport distance (number of pulses), the paper feeding process instructing section 53 executes a synchronization (tracing) control based on the instructed feeding distance (that is, the target PF transport distance and the target ASF transport distance) (step ST25).

FIG. 7 is a diagram illustrating a comparison table of features of the synchronization tracing) control and features of the simultaneous driving control in the ink jet printer 1 shown in FIG. 1. The left side of FIG. 7 shows a list of features of the synchronization (tracing) control and the right side of FIG. 7 shows a list of features of the simultaneous driving control. The features are described below.

First, in the synchronization (tracing) control, the PF motor 31 and the ASF motor 32 are simultaneously driven, similarly to the simultaneous driving control as shown in Column A of FIG. 7. specifically, in the synchronization (tracing) control, the actuation of the ASP motor 32 is started earlier than the actuation of the PF motor 31. In the simultaneous driving control, the actuations of the motors are not limited and both motors are simultaneously actuated.

Second, as shown in column B of FIG. 7, in the synchronization (tracing) control, the target ASF transport distance (number of pulses) is set slightly larger than the target PF transport distance (number of pulses) by the use of the calculation of Expression 1. In the simultaneous driving control, such a correction of transport distance is not performed.

The target PF transport distance (number of pulses) and the target ASF transport distance (number of pulses) are independently calculated.

Third, as shown in Column C of FIG. 7, in the synchronization (tracing) control, the target ASF transport distance instructed to the ASF control executing section 42 is based on the target PF transport distance instructed to the PF control executing section 41 as can be seen from Expression 1. On the contrary, in the simultaneous driving control, the target ASF transport distance instructed to the ASF control executing section 42 is a difference between a value, which is obtained by adding this newly instructed paper feeding distance to the cumulative value of the target ASF transport distance instructed to the ASF control executing section 42 after the feed process is ended, and the absolute ASF transport distance 64 after the feed process is ended (actual transport distance based on the previous instruction). That is, the absolute ASF transport distance 64 serves as a reference. The target PF transport distance instructed to the PF control executing section 41 is a difference between a value, which is obtained by adding this newly instructed paper feeding distance to the cumulative value of the target PF transport distance instructed to the PF control executing section 41 after the feed process is ended, and the absolute PF transport distance after the feed process is ended (actual transport distance based on the previous instruction).

Fourth, in the synchronization (tracing) control, as shown in column D of FIG. 7, the feed position of the second or subsequent printing mediums under continuous print is determined so that the after-PE-detection ASF transport distance 66 after the PE sensor 36 detects the printing medium is equal to the transport distance corresponding to the distance from the FE sensor 36 to the print start position. In the simultaneous driving control, the feed position is determined so that the after-PE-detection PF transport distance 65 after the PE sensor 36 detects the printing medium is equal to the transport distance corresponding to the distance from the PE sensor 36 to the print start position.

The synchronization (tracing) control has the above-mentioned features in comparison with the simultaneous driving control.

The paper feeding process instructing section 53 instructs the target PF transport distance to the PF control executing section 41 and instructs the target ASF transport distance to the ASF control executing section 42 in the synchronization (tracing) control (step ST25) based on an instructed feeding distance.

In the synchronization (tracing) control, first, the ASF control executing section 42 starts actuating the ASF motor 32.

Accordingly, the printing media P nipped between the LD roller 11 and the LD follower roller 12 is transported. At this time, the printing medium P is loosened between the LD roller 11 and the PF roller 14.

When the value of the absolute ASF transport distance 64 varies by a predetermined amount, the PF control executing section 41 starts actuating the PF motor 31. Accordingly, the printing medium P nipped between the PF roller 14 and the PF follower roller 15 starts its transports. The printing medium P is transported in a state where the printing medium is loosened between the LD roller 11 and the PF roller 14.

The ASF control executing section 42 stops the ASF motor 32 so that the variation of the absolute ASF transport distance 64 after starting the paper feeding process is equal to the target ASF transport distance. The PF control executing section 41 starting its drive later stops the PF motor 31 so that the variation of the absolute PF transport distance 62 after starting the paper feeding process is equal to the target PF transport distance. The transport distance of the printing medium P transported downstream in the transport direction of the printing medium P from the PF roller 14 is the transport, distance (number of pulses) of the PF roller 14 and is the instructed target Pr transport distance.

The ASF motor 32 starts its actuation earlier than the PF motor 31. However, the target ASF transport distance of the LD roller 11 is substantially equal to the target PF transport distance of the PF roller 14. Accordingly, in the state where the ASF motor 32 and the PF motor 31 are stopped, the looseness between the LD roller 11 and the PF roller 14 is substantially removed.

The target ABF transport distance of the LD roller 11 is slightly greater than the target PF transport distance of the PF roller 14. Accordingly, the stopped LD roller 11 does not hinder the PF motor 31 transporting the printing medium P. The printing medium P does not expanded and drawn between the LD roller 11 and the PF roller 14 by means of the rotation of the PF roller 14 after the ASF motor 32 is stopped. As a result the actual transport distance of the printing medium P on the downstream side from the PF roller 14 suitably follows the target PF transport distance of the PF roller 14 and is equal to the instructed paper feeding distance with high precision.

In this way, the first paper feeding process of the paper feeding process instructing section 53 is ended.

In the print data by printing medium, the ink ejection pattern data and the paper feeding distance data are alternately arranged as shown in FIG. 3. The print process instructing section 55 and the paper feeding process instructing section 53 are alternately selected in accordance with the arrangement order of the ink election pattern data and the paper feeding distance data. Accordingly, the printing operation based on the print data is performed on the printing medium P, for example, every scanning width.

As described above, when the printing operation on the first printing medium P is performed and the trailing end edge of the first printing medium P goes out of between the LD roller 11 and the LD follower roller 12, the second printing medium P which is the uppermost printing medium on the rear feed tray 2 pushed up by the hopper 13 is fed with the rotation of the LD roller 11 and is nipped between the LD roller 11 and the LD follower roller 12. In the paper feeding control, the second printing medium P starts its transport with the rotations of the PF motor 31 and the LD roller 11 controlled in the synchronization (tracing) control manner, subsequently to the first printing medium P. The second printing medium P usually starts its transport without any gap from the first printing medium P.

In the paper feeding process for the first printing medium, the paper feeding process instructing section 53 switches the instructions of the paper feeding process depending on the position of the trailing end edge of the first printing medium P under print. Specifically, the paper feeding process instructing section 53 switches the instructions of the paper feeding process depending on the following patterns. The paper feeding process in the patterns will be described with reference to FIGS. 2 and 5.

First, right after the first printing medium P starts its transport, the paper feeding process instructing section 53 judges No in step ST23 when the trailing end edge of the printing medium P under print does not pass the inter-page control start position (when it is in area A of FIG. 2) and is expected not to pass the inter-page control start position at the time of ending this paper feeding process (when it is in area A of FIG. 2). The paper feeding process instructing section 53 sets as a new target PF transport distance (number of pulses) a difference between a value, which is obtained by adding this newly instructed paper feeding distance to the cumulative value of the target PF transport distance instructed to the PF control executing section 41 after the feed process is ended, and the absolute PF transport distance 62 after the feed process is ended (actual transport distance based on the previous instruction), calculates the target ASF transport distance of the LD roller 11 slightly larger than the new target PF transport distance by the use of Expression 1 (step ST24), and performs the synchronization (tracing) control (step ST25).

Second, at the time of ending this paper feeding process, the paper feeding process instructing section 53 judges Yes in step ST23 when the trailing end edge of the printing medium P under print is expected to pass the inter-page control start position (when it moves from area A to area B in FIG. 2). The paper feeding process instructing section 53 sets as a new target PF transport distance (number of pulses) a difference between a value, which is obtained by adding the transport distance to the inter-page control start position to the cumulative value of the target PF transport distance instructed to the PF control executing section 41 after the feed process is ended, and the absolute PF transport distance 62 after the feed process is ended (actual transport distance based on the previous instruction), calculates the target ASF transport distance of the LD roller 11 slightly larger than the new target PF transport distance by the use of Expression 1 (step ST26), and performs the synchronization (tracing) control (step ST27). The subsequent printing Medium P starting its transport without any gap from the printing medium under print is transported to the inter-page control start position.

Thereafter, the paper feeding process instructing section 53 sets a new target PF transport distance (number of pulses) of the PF roller 14 a difference between a value, which is obtained by adding the remaining portion of the newly instructed paper feeding distance to the cumulative value of the target PF transport distance (which includes the previous transport distance to the inter-page control start position) instructed to the PF control executing section 41 after the feed process is ended and the absolute PF transport distance after the feed process is ended (the variation based on the previous control to the inter-page control start position) and thus supplies the new target PF transport distance to the PF control executing section 41 (step ST28). Accordingly, the printing medium P is transported by only the PF roller 14. The printing medium under print is transported by this newly instructed paper feeding distance.

Third, when the current position of the trailing end edge of the printing medium P under print passes the inter-page control start position, the paper feeding process instructing section 53 judges Yes in step ST22. Then, the paper feeding process instructing section 53 sets as a new target PF transport distance (number of pulses) a difference between a value, which is obtained by adding this newly instructed paper feeding distance to the cumulative valise of the target PF transport distance instructed to the PF control executing section 41 after the feed process is ended, and the absolute PF transport distance after the feed process is ended (actual transport distance based on the previous instructions) and supplies the new target PF transport distance to the PF control executing section 41 (step ST29). Accordingly, the printing medium P is transported by only the PF roller 14. The printing medium under print is transported by the newly instructed paper feeding distance.

The paper feeding process instructing section 53 has a fourth pattern. The fourth pattern is selected, for example, in the paper feeding process of the final printing medium P in the continuous printing operation. In the fourth pattern, the paper feeding process instructing section 53 sets as a new target PF transport distance (number of pulses) a difference between a value, which is obtained by adding this newly instructed paper feeding distance to the cumulative value of the target PF transport distance instructed to the PF control executing section 41 after the feed process is ended, and the absolute PF transport distance after the feed process is ended (actual transport distance based on the previous instructions) and supplies the new target PF transport distance to the PF control executing section 41 (step ST37). Accordingly, the printing medium P is transported by only the PF roller 14. The printing medium under print is transported by the newly instructed paper feeding distance. In the fourth pattern, the hopper 13 goes down from the feed position to a retreat position and the LD follower roller 12 is in a retreat state where it is separated from the LD roller 11.

When the leading end edge of the next printing medium P passes the PE sensor 36 by means of the paper feeding controls, the detection value calculator 43 updates the after-PE-detection PF transport distance 65 and the after-PE-detection ASF transport distance 66 stored in the memory 39 to the transport distance after a new sheet is detected by the PE sensor 36.

As described above, the paper feeding process and the print process on the first printing medium P are repeated while the instruction patterns in the paper feeding process of the paper feeding process instructing section 53 are switched. Thereafter, the next control judgment section 51 reads the first page identification data for distinguishing the second sheet from the first sheet. The next control judgment section 51 instructs the discharge process instructing section 54 to perform its process.

The discharge process instructing section 54 instructed to perform its process executes the flow of the discharge process shown in FIG. 6. The discharge process instructing section 54 first judges whether this discharge process is a discharge process of a continuous printing operation and whether a next page to he printed exists (step ST41). For example, when the next page existence data is included in the print data by printing medium, the discharge process instructing section 54 judges that this discharge process is for the continuous printing operation and a next page exists. This discharge process is a discharge process on the first printing medium P in the continuous printing operation. Accordingly, the discharge process instructing section 54 judges Yes in step ST41.

The discharge process instructing section 54 judges whether the current position of the trailing end edge of the printing medium P under print passes the inter-page control start position (step ST42). The discharge process instruction section 54 specifies the length in the transport directions of the printing medium P on the basis of the sheet size data included in the print data by printing medium and compares the specified length with the feed ending distance. The discharge process instructing section 54 judges that the current position of the trailing end edge of the printing medium P under print passes the inter-page control start position, for example, when the feed ending distance is greater.

For example, when the printing operation on the first printing medium P is ended in the halfway of the printing medium, the current position of the trailing end edge of the printing medium P under print does not pass the inter-page control start position. In this case, the discharge process instructing section 54 judges No in step ST42.

When judging that the current position of the trailing end edge of the printing medium P under print does not pass the inter-page control start position, the discharge process instructing section 54 sets the remaining distance to the inter-page control start position as the target PF transport distance (number of pulses of PF roller 14 so that the position of the trailing end edge of the printing medium P under print is the inter-page control start position, calculates the target ASF transport distance (number of pulses) of the LD roller 11 slightly greater than the target PF transport distance, ann executes the synchronization (tracing) control (step ST43). Accordingly, the position of the trailing end edge of the printing medium P under print reaches the inter-page control start position. The leading end edge of the next printing medium P starting its transport subsequently to the printing medium P under print is located at the inter-page control start position.

For example, when the printing operation on the first printing medium P is performed up to the trailing end edge of the printing medium P, the position of the trailing end edge of the printing medium P under print already passes the inter-page control start position. In this case, the discharge process instructing section 54 judges Yes in step ST42. The discharge process instructing section 54 ends the discharge process without executing a specific transport control.

In this way, when the discharge process on the first printing medium P by the discharge process instructing section 54 is ended, the process on the print data of the first printing medium is ended. At the time of ending the discharge control on the first printing medium P, the leading end edge of the second printing medium P is located at the inter-page control start position. The next control judgment section 51 reads the print data of the second printing medium and instructs the feed process instructing section 52 to perform the feed process on the second printing medium P.

The feed process instructing section 52 starts the teed process on the second printing medium in accordance with the flowchart shown in FIG. 4. The feed process instructing section 52 resets the absolute PF transport distance 62 and the absolute ASF transport distance 64 stored in the memory 39 of the ASIC 37 to "0" (step ST1) and then judges that this feed process is a print printing operation on the second or subsequent printing medium in the continuous print (Yes in step ST2).

When judging that this feed process is the printing operation on the second or subsequent printing medium in the continuous print, the feed process instructing section 52 judges whether the inter-page control of setting a gap between plural printing mediums P which are continuously fed has been ended (step ST11). The feed process instructing section 52 specifies the length in the transport direction of the printing medium P on the basis of the sheet size data included in the print data by printing mediums and compares the feed ending distance calculated from the absolute PE transport distance 62 or the absolute ASF transport distance before the reset with a value which is obtained by adding distance D indicated by the distance data 71 to the specified length. The feed process instructing section 52 judges that the inter-page control is ended, for example, when the feed ending distance before the reset is greater.

Referring to a flag which goes upright when the paper feeding process instructing section 53 executes the PF control of step ST28 or ST29 or when the paper feeding process instructing section 53 generates a gap greater than the inter-page gap length between the previous printing medium P and the current printing medium P, the feed process instructing section 52 may judge that the inter-page control is ended when the flag is upright.

Similarly to the case where the discharge control is executed so that the trailing end edge of the first printing medium P is located at the inter-page control start positions for example, when the inter-page control is not ended, the feed process instructing section 52 executes the inter-page control (step STL12). Specifically, the feed process instructing section 52 sets the remaining distance of the inter-page gap length as the target PF transport distance of the PF roller 14 and instructs the target PF speed to only the PF control executing section 41. Accordingly, the printing medium P is transported by only the PF roller 14. A predetermined gap length is secured between the trailing end edge of the first printing medium P and the leading end edge of the second printing medium P by means of the inter-page control. The gap between the trailing end edge of the first printing medium P and the leading end edge of the second printing medium P is equal to or greater than the predetermined inter-page gap length. The feed process instructing section 52 may set the inter-page gap length as the target PF transport distance of the PF roller 14 and may instruct the target PF speed to only the PF control executing section 41.

In this way, after the inter-page control is executed in step ST12 or when the inter-page control is already ended, the feed process instructing section 52 instructs the feed control including the synchronization (tracing) control up to the print start position to the PF control executing section 41 and the ASF control executing section 42 (step ST13).

In the synchronization tracing) control on the second or subsequent printing mediums under the continuous print up to the print start position, the ASF control executing section 42 stops the actuation of the ASF motor 32 so that the after-PE-detection ASF transport distance 66 corresponds to the distance from the PE sensor 36 to the print start position. As described as the fourth feature in FIG. 7, the PF control executing section 41 stops the actuation of the PF motor 31 so as to stop when the after-PE-detection ASF transport distance 66 corresponds to the distance from the PE sensor 36 to the print start position.

The PF roller 14 starts its actuation later than the LD roller 11. In step ST13, the transport distances or the absolute ASF transport distance 63 and the after-PE-detection PF transport distance 65 are smaller than those of the absolute ASF transport distance 63 and the after-PE-detection ASF transport distance 66 by the delay time, that is, by the hatched portion in Column A of FIG. 7. As a result, by allowing the PF control executing section 42 to control the PF motor 11 so as to stop when the after-PE-detection PF transport distance 65 corresponds to the distance from the PE sensor 36 to the print start position, the precision in feed position o the second or subsequent printing mediums is deteriorated when the plural printing medium P are continuously fed. Specifically, the feed position of the second or subsequent printing mediums tends to depart upstream in the transport direction 4 of the printing medium P from the feed position of the first printing medium. That is, the second or subsequent printing mediums P under the continuous print tend to depart upstream in the transport direction 4 from the accurate feed position of the first printing medium. As a result, the leading end edge of the printing medium is fed only to the front of the print start position.

On the contrary, when the PF control executing section 41 controls the PF motor 31 to stop when the after-PE-detection ASF transport distance 66 corresponds to the distance from the PE sensor 36 to the print start position, the leading end edge of the printing medium P is fed to the print start position with high precision. The feed position of the second or subsequent printing medium P is substantially matched with the feed position of the first printing medium P.

Actually, the PF control executing section 41 starts at the same time as the ASF control executing section 42 starts the deceleration and stop control. Right before starting the deceleration and stop control, the ASF detection speed 63 by the LD roller 11 and the PF detection speed 61 by the PF roller 14 are set to a substantially constant speed. Accordingly, by matching the start timing or the deceleration and stop controls with each other, the PF control executing section 41 can stop the PF roller 14 when the ASF control executing section 42 stops the LD roller 11. The PF control executing section 41 can control the PP roller 14 to stop when the transport distance of the LD roller 11 after the PE sensor 36 detects a new printing medium P subsequently fed is a predetermined transport distance.

After feeding the second printing medium P to the print start position, the feed process instructing section 52 judges whether a next page to be printed exists on the basis of the continuous-printing print data or the like(step ST14). For example, when the third or subsequent page does not exist, the feed process instructing section 52 supplies the ASIC 37 with an instruction for actuating the ASF sub motor 33 (step ST15). The ASIC 37 actuates the ASF sub motor 33 and the LD follower roller 12 is separated from the LD roller 11. On the contrary, when the third or subsequent page to be printed exists, the feed process instructing section 52 ends the feed process without separating the LD follower roller 12 from the LD roller 11., When the second printing medium starts its transport by the paper feeding process on the first printing medium P or when the second printing medium P starts its transport by the feed process on the second printing medium, the second printing medium P is fed to the print start position by the above-mentioned feed process on the second printing medium P.

Thereafter, in the ink jet printer 1, the print control of the print process instructing section 55 and the paper feeding control of the paper feeding process instructing section 53 are repeated on the basis of the print data of the second printing medium. When the next control judgment section 51 reads final page identification data of the print data of the second printing medium, the discharge process of the discharge process instructing section 54 is started.

The ink jet printer 1 reads the print data by printing medium included in the continuous-printing print data and executes the same control as the second printing medium on the third or subsequent printing mediums. When the next control judgment section 51 reads the print data of the final printing medium under the continuous print, a control different from that up to that time is executed.

Specifically, since a next page to be printed does not exist in the paper feeding process on the final printing medium P, the feed process instructing section 52 judges No (final page)

in step ST14 of FIG. 4. The feed process instructing section 52 judges No (final page), for example, on the basis of the next page non-existence data in the print setting data. The paper feeding process instructing section 53 gives to the ASIC 37 an instruction for actuating the ASF sub motor 33 (step ST15). The ASIC 37 actuates the ASF sub motor 33 and the LD follower roller 12 is separated from the LD roller 11.

The paper feeding process instructing section 53 judges No in step ST21 of FIG. 5, because a next page to be printed does not exist. The paper feeding process instructing section 53 controls the paper feeding in accordance with the fourth pattern of the paper feeding control. That is, the paper feeding process instructing section 53 sets as a new PF target transport distance (number of pulses) a difference between a value, which is obtained by adding this newly instructed paper feeding distance to the cumulative value of the target PF transport distance instructed to the PF control executing section 41 after the feed process is ended, and the absolute PF transport distance 62 after the feed process is ended (actual transport distance based on the previous instruction) and instructs the target PF speed to only the PF control executing section 41 (step ST30) Accordingly, the printing medium P is transported by only the PF roller 14. The pressing contact state of the LD follower roller 12 with the LD roller 11 is released and the printing medium P is transported with the rotation of the PF roller 14.

The discharge process instructing section 54 judges No (final page) in step ST41, because a next page to be printed does not exist. The paper feeding process instructing section 53 sets as the target PF transport distance (number of pulses) of the PF roller 14 a predetermined transport distance by which the printing medium P under feed can be transported to the discharge tray and instructs the target PF speed to only the PF control executing section 41 (step ST44). The pressing contact state of the LD follower roller 12 with the LD roller 11 is released, and the printing medium P having been completely subjected to the printing operation is transported by only the PF roller 14 and discharged to the discharge tray.

In this way, when the print data of the final page among the continuous-printing print data is supplied to the ink jet printer 1, a control different from the control on the printing mediums P under the continuous print is executed. That is, the ink jet printer 1 executes substantially the same control as the paper feeding control in a usual print mode based on the usual print data.

The ink jet printer 1 can perform a printing operation on various printing mediums P such as sheets of regular paper and sheets of photo paper. The ink jet printer 1 can perform a printing operation on the printing medium P with different resolutions. The ink jet printer 1 has plural print modes depending on the types of the printing mediums P or the print quality. The print modes include a mode for performing a printing operation on a sheet of regular paper and a mode for performing a printing operation on a sheet of photo paper with high quality.

In a mode for performing a printing operation on the sheet of regular paper at a high speed among the plural print modes, the ink jet printer 1 performs the printing operation using the above-mentioned continuous print mode. That is, the ink jet printer 1 actuates both the ASF motor 32 and the PF motor 31 to continuously feed the plural printing mediums P on the rear feed tray 2, with the LD follower roller 12 in contact with the LD roller 11.

In the other print mode the ink jet printer 1 feeds the printing mediums P sheet by sheet similarly to known ink jet printers, discharges the printing mediums when the printing operations on the printing mediums P is ended, and feeds the next printing medium P on the rear feed tray 2 to the printing area.

As described above, the ink jet printer 1 according to this embodiment can continuously feed the plural printing mediums P on the rear feed tray 2. The second or subsequent printing medium P continuously fed is transported to a predetermined temporary stop position (inter-page control start position) between the LD roller 11 and the PF roller 14 in the course of performing a printing operation on the previous printing medium P. Then, the second or subsequent printing medium is fed to the printing area by the subsequent feed control.

Accordingly, compared with the case where the previous printing medium P is first discharged and then the subsequent printing medium P is transported to the printing area from the rear feed tray 2, it is possible to reduce the time for feeding the second or subsequent printing medium P. It is possible to reduce the feed gap of the printing mediums P and to enhance the number of printing mediums which can be subjected to the printing operation per unit time.

The second or subsequent printing medium P continuously fed is fed to the printing area by the feed control from the predetermined temporary stop position (inter-page control start position) between the LD roller 11 and the PF roller 14. The second or subsequent printing medium is fed to the printing area by the same feed control as the first printing medium P. The variation in feed position of the second or subsequent printing medium P continuously fed does not include a cumulative control error due to plural tines of paper feeding control, unlike the case where the second or subsequent printing medium P is transported to the printing area by plural times of paper feeding control. Accordingly, it is possible to continuously feed the plural printing mediums P while suppressing the variation in feed position of the second or subsequent printing medium continuously fed.

In this embodiment, the PE sensor 36 is disposed between the temporary stop position (inter-page control start position) and the PF roller 14. The feed process instructing section 52 controls the feed position of a printing medium P in the feed control on the respective printing mediums P when the leading end edge of the printing medium P is detected by the PE senor 36. Accordingly, the first printing medium P fed to the printing area from the rear feed tray 2 and the second or subsequent printing medium P fed to the printing area from the inter-page control start position are controlled in feed position when the leading end edge of the printing medium P is detected by the PE sensor 36 in the individual feed control. The variation in feed position of the second or subsequent printing medium P continuously fed is suppressed to be as small as the variation in feed position of the first printing medium P.

In this embodiment, when continuously transporting the plural printing mediums P, the LD follower roller 12 coming in contact with the LD roller 11 at the time of feeding the plural printing mediums P on the rear feed tray 2 is maintained in the state where it is in contact with the LD roller 11 during the period of time from the feed control on the first printing medium P to the feed control on the final printing medium P.

Accordingly, the second or subsequent printing medium P continuously fed can be nipped between the LT roller 11 and the LD follower roller 12 and can be maintained at a predetermined temporary stop position (inter-page control start position).

The second or subsequent printing medium P continuously fed can be maintained at the predetermined temporary stop position (inter-page control start position) in the course of performing a printing operation on the previous printing medium P.

By employing this configuration, a control of contacting and separating the LD follower roller 12 every printing medium P may not be executed at the time of continuously transporting the plural printing mediums P. Accordingly, the control time for contacting and separating the LD follower roller 12 every printing medium P is not necessary, thereby further enhancing the number of printing mediums which can be subjected to the printing operation per unit time. It is also possible to reduce to the minimum the number of times when an operation sound occurring at the time of contacting and separating the LD follower roller 12 every printing medium is generated.

In this embodiment, when the second or subsequent printing medium P continuously fed is not transported to the predetermined temporary position (inter-page control start position) in the course of performing the printing operation on the previous printing medium P the teed process instructing section 52 executes the inter-page control in the feed control on the printing medium P and sets a predetermined gap from the previous printing medium P. Accordingly, even when the printing medium P to be next fed is not transported to the temporary stop position (inter-page control start position) in the course of performing a printing operation on the previous printing medium P, it is possible to secure a predetermined gap from the previous printing medium P. The feed process instructing section 52 can control the feed position of the printing medium P in the feed control when the leading end edge of the printing medium P is detected by the PE sensor 36.

In this embodiment, the paper feeding process instructing section 53 actuates both the ASF motor 32 and the PF motor 31 until the trailing end edge of the printing medium P under print passes the predetermined temporary stop position (inter-page control start position) and actuates only the PF motor 31 when the trailing end edge of the printing medium P under print is passing the predetermined temporary stop position (inter-page control start position). Accordingly, the paper feeding process instructing section 53 can transport the leading end edge of the second or subsequent printing medium p continuously fed during the printing operation to the predetermined temporary stop position (inter-page control start position) as the judgment result on the trailing end edge of the printing medium P under print. It is possible to transport the leading end edge of the subsequent printing medium P, which starts its transport without any gap from the previous printing medium P, to the predetermined temporary stop position (inter-page control start position).

In this embodiment, when the length in the transport direction of the actually transported printing medium P detected by the PE sensor 36 disposed in the transport path of the printing medium P is greater than the length in the transport direction based on the sheet size data of the print data supplied to the ink jet printer 1, the paper feeding process instructing section 53 judges that the trailing end edge of the printing medium P under print is passing the predetermined temporary stop position (inter-page control start position). Accordingly, the ink jet printer 1 can allow the paper feeding process instructing section 53 to judge that the trailing end edge of the printing medium P under print is passing the predetermined temporary stop position (inter-page control start position) without allowing the sensor to detect the printing medium P at the temporary stop position (inter-page control start position).

In this embodiment, the transport controllers such as the feed process instructing section 52, the paper feeding process instructing section 53, and the discharge process instructing section 54 actuates both the ASF motor 32 and the PF motor 31 to continuously feed the plural printing mediums PF with the LD follower roller 12 in contact with the LD roller 11 in some print modes including the mode for performing a printing operation on at least sheets of regular paper at a high speed among plural print modes of the ink jet printer 1. In the other print modes, the transport controllers feed the plural printing mediums P on the rear feed tray 2 by separating the LD follower roller 12 from the LD roller 11 every time of feeding a printing medium P. Accordingly, the ink jet printer 1 can make the print speed and the print quality compatible with each other at a high level corresponding to the print mode, compared with an ink jet printer having only a function of feeding the plural printing mediums P on the rear feed tray 2 by separating the LD follower roller 12 from the LD roller 11 every time of feeding a printing medium P.

The above-mentioned embodiment is an exemplary embodiment of the invention, but the invention is not limited to the embodiment. The invention can be modified or changed in various forms without departing from the gist of the invention.

In the above-mentioned embodiment, the discharge process instructing section 54 executes the synchronization (tracing) control until the trailing end edge of the printing medium P under print reaches the inter-page controls start position, and the feed process instructing section 52 executes the inter-page control. In addition, the discharge process instructing section 54 may execute the synchronization (tracing) control and the inter-page control until the trailing end edge of the printing medium P under print reaches the inter-page control start position.

In the above-mentioned embodiment, the PE sensor 36 serving to detect the printing medium P between the LD roller 11 and the PF roller 14 is an optical sensor that optically detects the printing medium P. In addition, a sensor serving to detect the printing medium P between the LD roller 11 and the PF roller 14 may include a lever lifted and revolved by the printing medium P transported in the rear printing-medium transport path 4 and an optical sensor that optically detects the position of the lever.

In the above-mentioned embodiment, the memory 70 of the micro computer 38 stores the distance data 71 and the inter-page gap length data 72. In addition, the memory 70 may store second distance data obtained by subtracting the inter-page gap length from distance D in FIG. 2 instead of the inter-page gap length data 72 or may store the inter-page gap length data 72 instead of the distance data 71, instead of the distance data 71, along with the second distance data. The feed process instructing section 52, the papers feeding process instructing section 53, and the discharge process instructing section 54 can obtain a predetermined distance by adding or subtracting the data appropriately. The distance data 71, the inter-page gap length data 72, and the like nay be stored in the memory 70 as a part of a program (for example, a constant in the program) for implementing the feed process instructing section 52, the paper feeding process instructing section 53, and the discharge process instructing section 54 which are embodied by the micro computer 38.

In the above-mentioned embodiment, the detection value calculator 43 stores the transport distance after the detection of the PE sensor 36 in the memory 39 as the after-PE-detection PF transport distance 65 and the after-PE-detection ASF transport distance 66. In addition, for example, the detection value calculator 43 may store in the memory 39 the value of the absolute PE transport distance 62 or the absolute ASF transport distance 64 when the PE sensor 36 detects the printing medium P.

In this modified example, the PF control executing section 41 or the ASF control executing section 42 subtracts the value of the measured absolute PF transport distance stored in the memory 39 from the absolute PF transport distance 62 stored in the memory 39 and can use the subtraction result as the after-PE-detection PF transport distance 65. The PF control executing section 41 or the ASF control executing section 42 subtracts the value of the detected absolute ASF transport distance stored in the memory 39 from the absolute ASF transport distance 64 stored in the memory 39 and can use the subtraction result as the after-PE-detection ASF transport distance 66.

In the above-mentioned embodiment, the feed process instructing section 52, the paper feeding process instructing section 53, and the discharge process instructing section 54 judge the position of the subsequent printing medium P of the next page for the inter-page control by using the after-PE-detection PF transport distance 65 in the calculation.

In addition, the feed process Instructing section 52, the paper feeding process instructing section 53, and the discharge process instructing section 54 may judge the position of the printing medium P of the next page for the inter-page control or the like by using the after-PE-detection ASF transport distance 66 in the calculation instead of the after-PE-detection PF transport distance 65.

In the above-mentioned embodiment, for example, when feeding plural printing mediums P on the rear feed tray, the ink jet printer 1 continuously feeds the plural printing mediums P. In addition, for example, when feeding plural printing mediums on the front feed tray 3, the ink jet printer 1 may continuously feed the plural printing mediums P.

In the above-mentioned embodiment, the print data supplied to the ink jet printer 1 is exemplified as being generated from the personal computer which can communicate with the ink jet printer 1. In addition, for example, a digital still camera (DSC) or the like may supply the print data by communicating with the ink jet printer 1. In a so-called multifunction device equipped with the ink jet printer 1, a scanner unit or an IC card reader disposed therein can supply the print data by communicating with the ink jet printer 1.

The invention can be suitably applied to an ink jet printer and the like.

What is claimed is:

1. A method of controlling an operation of transporting plural printing mediums on a tray, the printing mediums including a first medium and a second medium to be transported subsequent to the first medium, the method comprising:

actuating a first motor to drive a first roller adapted to pick up the printing medium on the tray and to transport the printing mediums;

actuating a second motor to drive a second roller disposed at a downstream side of the first roller and adapted to transport the printing mediums to a printing area at which a printing operation is to be performed on each printing medium;

transporting the first medium to a feed standby position by executing a simultaneous driving control, the feed standby position being arranged at a downstream side of the second roller;

stopping a leading end edge of the first medium at the feed standby position;

stopping the leading end edge of the first medium at a print start position when starting the printing operation on the first medium, the print start position being arranged at a downstream side of the feed standby position;

stopping a leading end edge of the second medium at a stop position arranged between the first roller and the second roller while performing the printing operation on the first medium; and transporting the second medium to the print start position by executing a synchronization control, wherein in the synchronization control, actuation of the first motor is started earlier than actuation of the second motor, and in the simultaneous driving control, the first motor and the second motor are simultaneously actuated, in the synchronization control, a target transport distance of the first motor is larger than a target transport distance of the second motor, a plurality of rollers including the second roller are disposed at the downstream side of the first roller, the second roller is closest to the first roller among the plurality of rollers, and when the first medium has been passed through the first roller, the second medium is picked up by the first roller.

2. The method according to claim 1, further comprising:

detecting a leading and edge of each printing medium between the stop position and the second roller, wherein a feed position of each printing medium in a feed control for each printing medium is controlled when the leading end edge of the corresponding medium is detected.

3. The method according to claim 1, wherein when the printing mediums are continuously transported, a third roller that comes in contact with the first roller at a time of transporting each printing medium on a tray is kept in a contact state with the first roller for at least a time period from a time when a feed control for one of the printing mediums which is initially transported is performed to a time when a feed control for one of the printing mediums which is finally transported is performed.

4. The method according to claim 1, wherein when the second medium is not transported to the stop position while the printing operation on the first medium is performed, an inter-page control of setting a predetermined distance between the first medium and the second medium is performed in a discharge control for the first medium or a feed control for the second medium.

5. The method according to claim 1, wherein the first motor and the second motor are together actuated until a trailing end edge of the first medium under print reaches the stop position, and only the second motor is actuated after the trailing end edge of the first medium passes the stop position.

6. The method according to claim 5, wherein it is judged that the trailing end edge of the first medium passes the stop position when a distance from the stop position to the leading end edge of the first medium is larger than a length in a transport direction of size data in print data.

7. The method according to claim 1, wherein the first medium under print is transported based on judgment results and transport controls of the following (1) to (3):

(1) when it is judged that a current position of a trailing end edge of the first medium does not reach the stop position and a position of the trailing end edge after being transported by a predetermined distance does not reach the stop position, the first motor and the second motor are together actuated by the predetermined distance;

(2) when it is judged that a current position of a trailing end edge of the first medium does not reach the stop position and a position of the trailing end edge after being transported by a predetermined distance passes the stop position, the first motor and the second motor are actuated together until the first medium reaches the stop position, and the second motor is actuated by remaining distance of the predetermined distance after the first medium passes the stop position; and (3) when it is judged that a current position of a trailing end edge of the first medium passes the stop position, the second motor is actuated by a predetermined distance.

8. The method according to claim 1, wherein a third roller comes in contact with the first roller at a time of transporting each printing medium on a tray, in one print mode including at last a mode for printing a sheet of regular paper at a high speed among a plurality of print modes, the printing mediums are continuously transported by actuating the first motor, and the second motor together in a state where the third roller comes in contact with the first roller, and in the other print modes, every time each printing medium is transported, the third roller is separated from the first roller.

9. A printer comprising:

a first motor, operable to drive a first roller adapted to pick up plural printing medium, which includes a first medium and a second medium to be transported subsequent to the first medium, on a tray and to transport the printing mediums;

a second motor, operable to drive a second roller disposed at a downstream side of the first roller and adapted to transport the plural printing mediums to a printing area at which a printing operation is to be performed on each printing medium; and a controller, operable to transport the first medium to a feed standby position by executing a simultaneous driving control, the feed standby position being arranged at a downstream side of the second roller;

stop a leading end edge of the first medium at the feed standby position;

stop the leading end edge of the first medium at a print start position when starting the printing operation on the first medium, the print start position being arranged at a downstream side of the feed standby position;

stop a leading end edge of the second medium at a stop position arranged between the first roller and the second roller while performing the printing operation on the first medium; and transport the second medium to the print start position by executing a synchronization control, wherein in the synchronization control, actuation of the first motor is started earlier than actuation of the second motor, and in the simultaneous driving control, the first motor and the second motor are simultaneously actuated, in the synchronization control, a target transport distance of the first motor is larger than a target transport distance of the second motor, a plurality of rollers including the second roller are disposed at the downstream side of the first roller, the second roller is closest to the first roller among the plurality of rollers, and when the first medium has been passed through the first roller, the second medium is picked up by the first roller.

* * * * *